G. D. PARKER.
FRUIT SIZING APPARATUS.
APPLICATION FILED MAY 1, 1917.
1,257,018.
Patented Feb. 19, 1918.
4 SHEETS—SHEET 4.
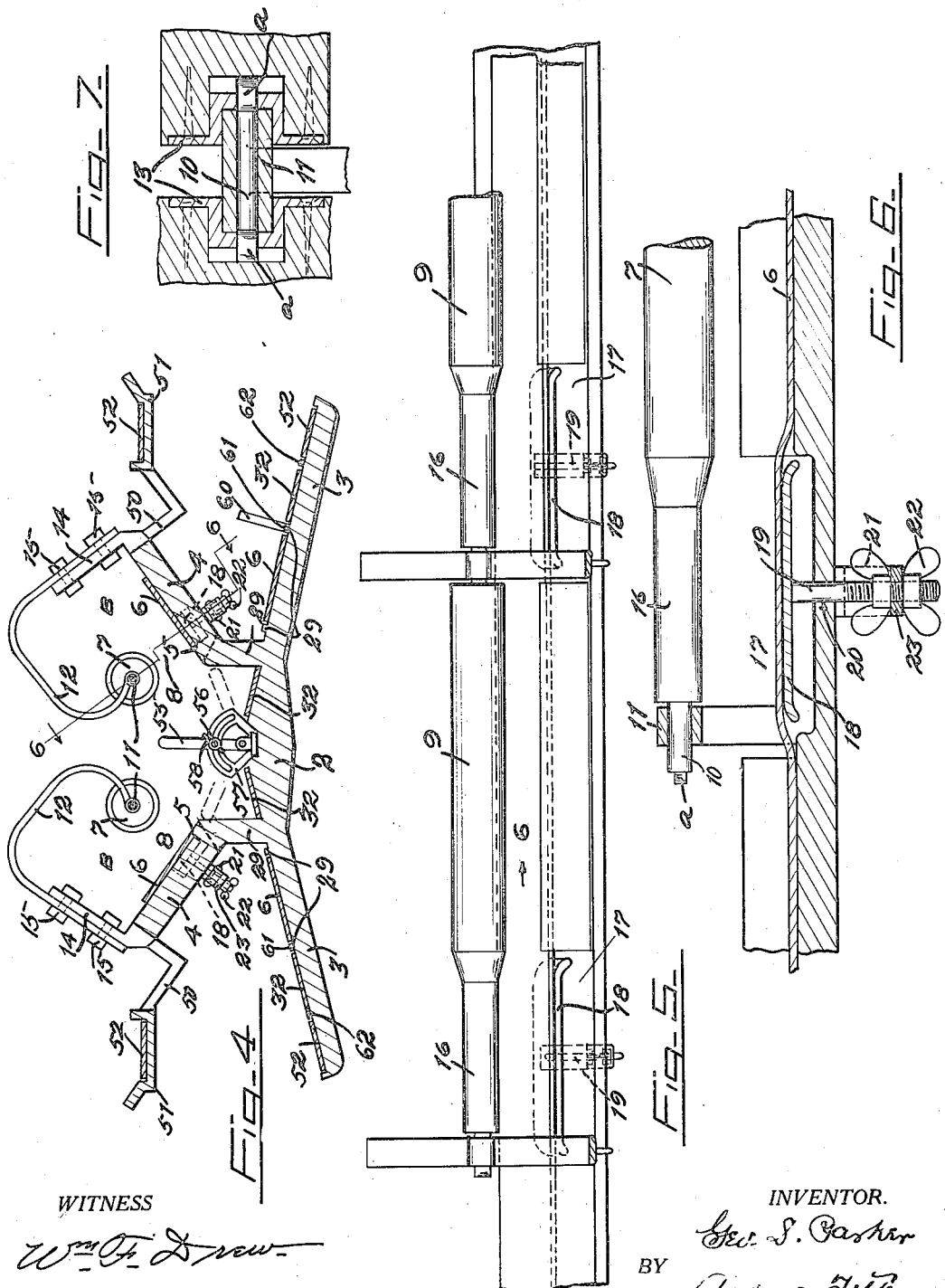
WITNESS
INVENTOR.
BY
his ATTORNEYS.

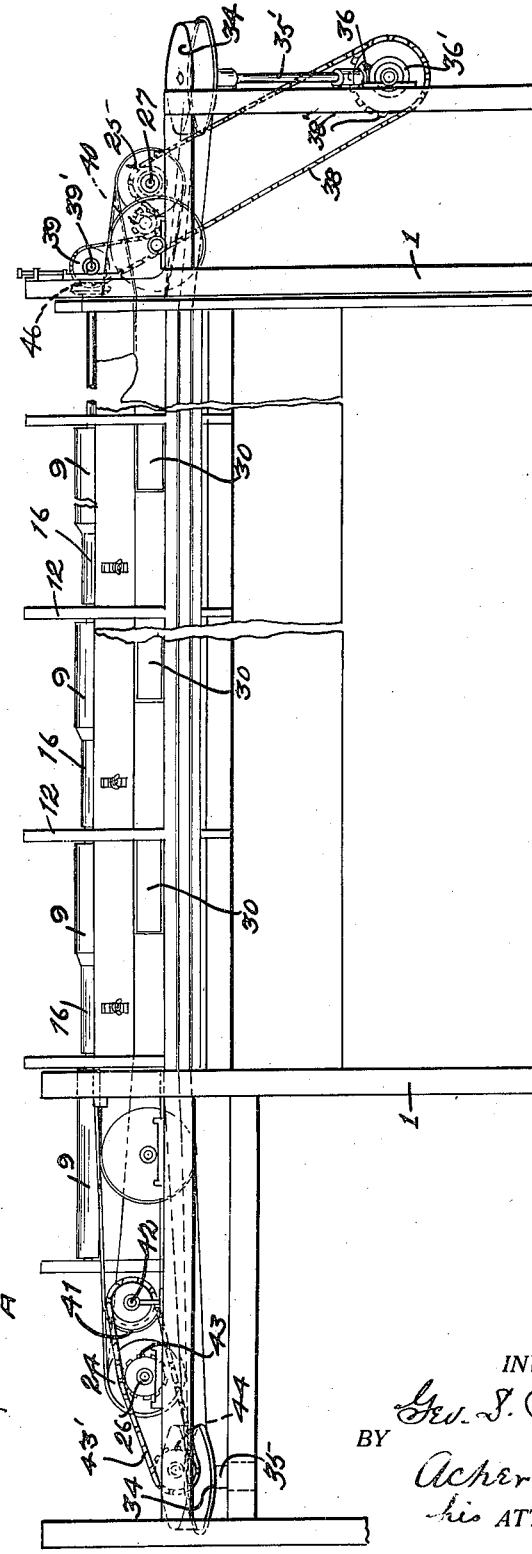

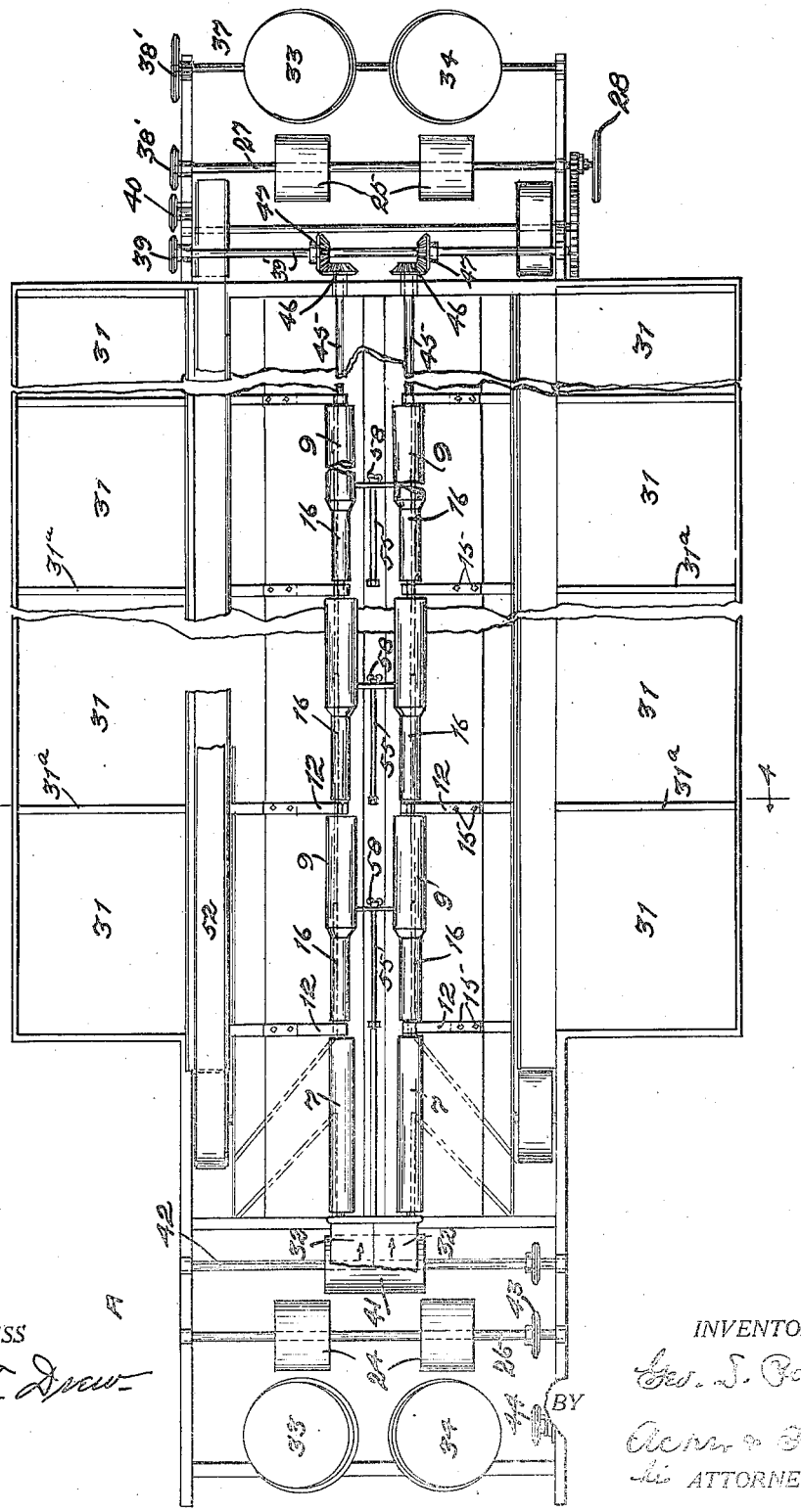

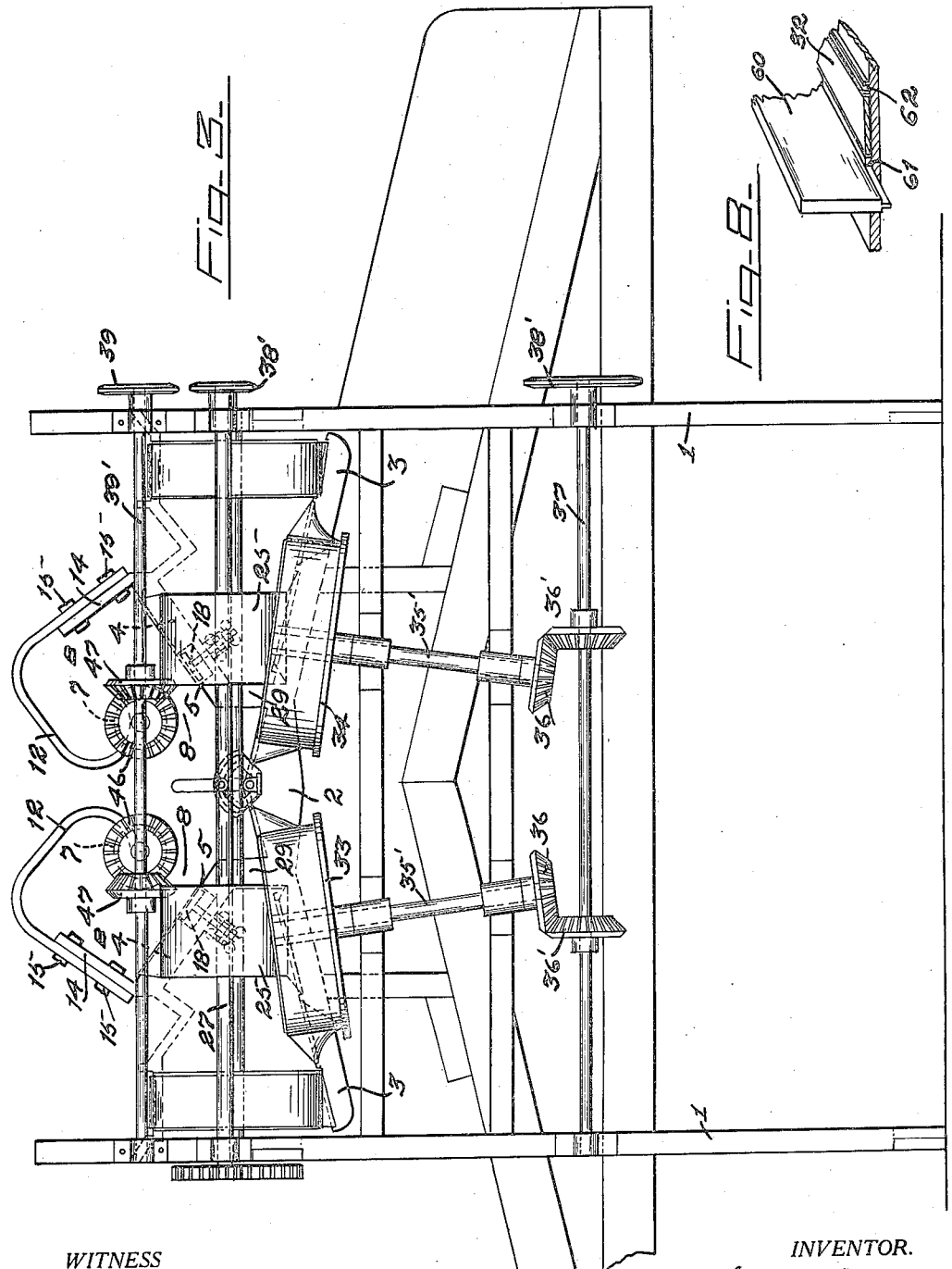

UNITED STATES PATENT OFFICE.

GEORGE D. PARKER, OF RIVERSIDE, CALIFORNIA.

FRUIT-SIZING APPARATUS.

1,257,018. Specification of Letters Patent. Patented Feb. 19, 1918.

Application filed May 1, 1917. Serial No. 165,656.

*To all whom it may concern:*

Be it known that I, GEORGE D. PARKER, a citizen of the United States, residing at Riverside, in the county of Riverside and State of California, have invented certain new and useful Improvements in Fruit-Sizing Apparatus, of which the following is a specification.

The hereinafter described invention relates to an improved apparatus for the sizing of fruit, that is, for separating the fruit according to sizes and delivering the same into bins situated at one side of the fruit runway of the apparatus for the reception of the sized fruit; the apparatus being more particularly designed for the sizing of oranges as conveyed through the fruit runway of the machine, although the invention is adapted for the sizing of olives, nuts and fruit generally, which is capable of being treated in a machine of such character.

In the sizing of oranges, usually provision is made for separating the fruit into nine sizes as conveyed through the runway of the apparatus, although a greater or less number of sizes may be secured by the use of the hereinafter described invention, which relates more particularly to the providing of means for permitting an increase of capacity as to bin space for the reception of the sized fruit, in order to provide for a number of packers, if so desired, working at any of the bins into which the sized fruit is received.

The design and construction of the apparatus is such, as to permit of the same being employed as a double sizer or as a single sizer, the same being provided with means for controlling the flow direction of the sized fruit to either side of the apparatus, thereby permitting all of the fruit of a given size to be directed into bins situated at one side of the apparatus, while all of the fruit of other sizes may be directed to bins situated at the opposite side of the apparatus. By this means, where nine sizes of fruit are to be secured four fruit receiving bins may be situated or located at one side of the fruit grader and five at the opposite side, the size of each of which bins being thus of greater capacity than where nine bins are situated at either side of the apparatus, where the machine is employed as a double sizer. Usually a sizer adapted for dividing the fruit into nine sizes is approximately thirty-six (36) feet in length, and where nine bins are employed at either side of the apparatus and the bins divided into equal capacity, it is obvious that each bin is approximately four feet in length. By the present invention, the same bin capacity is obtainable by the making of the sizer approximately twenty feet in length, placing at one end side thereof, five bins four feet in length, and at the opposite side four bins, five feet in length, or if the machine be constructed the usual length, viz.— thirty-six feet and employed as a single sizer, the bins may be so arranged as to give four nine foot bins to one side of the machine and five bins approximately seven feet in length at the opposite side of the sizer, thereby materially increasing the capacity of the receiving bins.

While the invention has incorporated therein means for controlling or regulating the discharge of the sized fruit with respect to the bins designed for the reception thereof and means for varying or controlling the discharge outlets of the fruit runway, one of the essential features thereof is the providing of means within the fruit runway or adjacent to the fruit runway for the varying or controlling the direction of flow of the sized fruit with respect to the fruit receiving bins, whereby one or more stream flows of the sized fruit may be directed to one side of the apparatus for the delivery into bins situated at such side, and other flow streams of sized fruit may be directed toward the opposite side of the sizing apparatus and into fruit receiving bins situated at such side for the reception of the sized fruit.

To comprehend the invention, reference should be had to the accompanying sheets of drawings, wherein, Figure 1 is a side view in elevation partly broken away, of the improved sizing apparatus, illustrating the position of the various working parts and the means for adjusting the conveyer belts for varying the discharge outlets for the sized fruit.

Fig. 2 is a broken top plan view of the apparatus disclosing the position of the hinged deflector means situated within the fruit runway of the apparatus for controlling the flow of the discharging sized fruit with respect to the fruit receiving bins.

Fig. 3 is a front end elevation of the apparatus, disclosing the position of the respective parts and the means for shifting the position of the deflectors within the fruit runway.

Fig. 4 is an end sectional view taken on the line 4 4, Fig. 2 of the drawings and viewed in the direction of the arrow.

Fig. 5 is a broken top plan view illustrating one of the fruit runways of the apparatus and disclosing the means for deflecting the conveyer belts for regulating or varying the discharge outlets for the fruit to be sized.

Fig. 6 is an enlarged broken detailed plan view of a section of the fruit runway illustrating more clearly than is shown in Figs. 4 and 5 of the drawings, the means for adjusting or flexing the conveyer belts relative to the rotary members of the fruit runway for regulating the discharge outlets of the runways for the fruit.

Fig. 7 is a broken detailed longitudinal sectional view disclosing two adjacent sections of one of the rotating wall members of the apparatus, illustrating the bearing bracket for the said roller sections and the means for connecting the adjacent ends of the said sections for the transmission of rotation from one roller section to its companion roller section of the rotary wall member whereby the connected series of longitudinally disposed roller sections are driven in unison by power applied at one end of the machine.

Fig. 8 is a detailed perspective view of one of the barrier boards for regulating the position of the discharging fruit relative to the bin to receive the same.

In the present illustration of the invention, there is disclosed, what is known in the art as a double sizer, which is an apparatus provided with two parallel fruit runways, through which the fruit to be sized is conveyed, and in the present case, an endless traveling belt is illustrated in connection with each of the parallel fruit runways, as the means for conveying the fruit to be sized therethrough, although, the apparatus is adapted for use either as a double sizer or as a single sizer. When, however, installed for use as a single sizer, the length of the apparatus may, if so desired, be considerably less than where installed for use as a double sizer, with the advantage, that the bins may be divided between the two sides of the apparatus and thereby greater bin capacity secured than where used a double sizer requiring an equal number of bins on each side of the apparatus, or a bin on each side for each size of the fruit to be secured. However, so far as the present invention is concerned, it is immaterial whether the apparatus be installed as a double sizer or installed for use as a single sizer. For where installed as a double sizer, and used as a single, the fruit is distributed to each side of the machine, permitting bins of greater capacity to be employed at each side of the machine than where the entire flow of fruit through each runway is sized and conveyed to bins situated solely at one side of the apparatus. For, in the latter case, the length of the bin space must in the aggregate equal approximately the length of the fruit sizing apparatus, whereas, when used as a single sizer, the nine bins may be distributed between the two sides of the apparatus and by so doing greater capacity bin for the flow stream of each size of the fruit is obtained, which not only permits of a greater quantity of fruit being directed to the respective bins, but permits of more than one operator working at each bin for the removal of the sized fruit therefrom for packing purposes.

In the drawings, reference being had more particularly to Figs. 2, 4, 5, 6, and 7 thereof, the reference numeral 1, is employed to designate any suitable form of a frame structure supporting the top 2 of the apparatus, which said top 2 is provided with the outwardly and downwardly inclined sides 3. Above the top 2 there is secured in any suitable manner, to partly overlie the downwardly inclined portion 3 thereof, the upwardly inclined supporting side walls 4, each of said walls being provided with a longitudinally disposed shouldered portion 5 for the holding or supporting of the longitudinally disposed endless traveling belt 6. Opposing each supporting or guide wall 4, and in a plane above the same, is held a rotating wall member 7, which serves in conjunction with the supporting or guide-wall 4, to form a horizontally disposed fruit runway 8. The rotating wall member of each fruit runway is composed of a series of roller sections 9, which sections are arranged end to end throughout the length of the sizing apparatus and the ends of adjacent sections united one to the other by means of a coupling pin 10. Each pin extends through a bearing head 11 of an overhanging bracket 12, and the projecting ends $a$ of each pin are formed square so as to fit within a square socket formed within the bushings 13, which bushings are fitted within a socket formed in the connecting ends of the roller sections 9. By this manner of uniting the roller sections, one to the other, it is obvious, that rotation applied to the end of the forward roller section is transmitted to the successive roller sections, so that the series of connected roller sections rotate in unison and to this extent, act as a single rotating wall member. There is a bearing bracket 11 for the ends of each roller section and in the present case, the free ends of the bearing brackets 13 are united to a support 14 upwardly springing from the supporting guide walls 4 for the endless traveling conveyer belts 6, and are secured to, and held clamped to the said member 14 by means of suitable bolts 15. It will be understood, that no vertical adjustment is provided for the connected sections of the rotating wall member 7 to vary the position thereof relative to the fixed guide support or walls 4 after the apparatus is installed, the position of said rotating wall member being a fixed one, so that the united roller sections supported thereby are held a fixed distance from the surface of the longitudinally disposed supporting guide walls 4.

In order to separate the fruit flowing through the fruit runways of the apparatus into different sizes, it is necessary that outlet apertures, of different sizes, be provided at intervals throughout the length of the fruit runway, and for this purpose, the inner end of each roller section 9, is cut away or reduced for a distance of approximately 9 or 10 inches, as indicated at 16, so that, at such portions of the fruit runway, the distance between the surface of the longitudinally disposed supporting or guide wall 4 and the rotating wall member 7 of the fruit runways is greater than the distance between the remaining portions of the runways, thus producing, so to speak, a fruit runway of stepped form. In the face of the longitudinally disposed supporting and guide wall 4 of each fruit runway is formed a series of seats or cut-outs 17, which lie directly below each cut-out portion 16 of the roller sections 9 and rotating wall member 7, and within each of said seat or cut out sections of the said supporting or guide wall 4, is fitted an adjustable plate or leaf 18, each of said plates or leaves carrying a projecting screw threaded stem 19, which extends through an opening 20 and on the outer or projecting end portion thereof work the wing nuts 21 and 22. The screw threaded portion of the stem 19 extends through a bracket member 23 and the wing nuts are arranged on each side of the said bracket. By screwing and unscrewing the wing nuts the leaves 18 may be moved toward and from the rotary wall member of the fruit runway and inasmuch as the endless traveling conveyer belts 6 work over the surface of the said leaves 18, it is obvious that as the said leaves are raised or moved out of the seats of the side walls 4, the said endless conveyer belts 6 are flexed at such points and thereby decreasing the distance between the supporting guide walls 4 and the rotary wall member 7 at points adjacent the cut-out sections 16 of the roller sections of the said rotary wall member. By this means the opening between the wall members of the fruit runway opposing the cut-out portions 16 of the rotary wall member may be increased or decreased at will to provide discharge outlet openings 8 of varying sizes, each discharge outlet being of an appropriate size for the fruit to be discharged therethrough, and each varying a given distance successively throughout the length of the fruit runway. The smallest discharge outlet is usually arranged at the feed end of the machine, the said openings progressively increasing in size toward the foot of the machine, the smallest size of oranges escaping from the first of the series of outlets of the fruit runways at the forward end of the machine and the largest size through the discharge outlet at the lower end of the fruit runways. A fruit runway having a series of controlled graduated discharge outlets arranged at points throughout the length of the fruit runway is thus provided, each discharge opening being capable of being increased or decreased at will without changing or varying the position of the rotary wall member of the fruit runways.

The endless traveling conveyer belts 6 work over the pulleys 24 and 25 mounted respectively on the cross shafts 26 and 27 working in bearings secured to the frame 1 at the forward and rear ends of the machine, Figs. 1, 2 and 3 of the drawings. Motion is transmitted to the shaft 27 by means of a power belt, not shown, traveling over the belt pulley 28, secured to one of the projecting ends of the shaft 27. The return runs of the conveyer belts 6 travel over the surface of the inwardly inclined portions 3 of the top 2, Fig. 4 of the drawings, and work within guide-ways 29 formed in the upper surface of the said downwardly inclined portions 3 of the said table 2, the travel of upper run of the belt 6 being from the head end A of the table toward the foot thereof, the under run of the said belt moving in the opposite direction or from the discharge toward the feed end A of the apparatus.

The upwardly and outwardly inclined supporting or guide walls 4 of the apparatus which in conjunction with the rotary wall member 7 form parallel fruit runways B, are supported above the table 2 by means of the longitudinally disposed side walls 29, Figs. 1 and 4 of the drawings, and these side walls 29, at intervals throughout the length thereof are provided with outlet or discharge openings 30, there being as many of the said outlets or discharge openings 30 on each side of the apparatus as there are bins for the reception of the sized fruit, and these discharge outlets or openings are situated at points opposing the enlarged portions of the roller sections 9 of the rotary wall member 7, and it is through these outlets that the sized fruit escapes onto the downwardly inclined portions 3 of the table 2 and over which portions of the table the fruit flows into the bins 31, situated at each side of the apparatus for the reception of the sized fruit.

Over the surface of the table 2, travel the endless belts 32, which belts work over the drums 33 and 34, which drums are set at an inclination to the horizontal Fig. 3 of the drawings, and are mounted respectively on the vertical shafts 35 and 35', the shafts 35' constituting the drive shafts for the said drums 33 and 34 for imparting travel to the said endless belts 32, the said shafts having secured to the lower end thereof the pinions 36 which mesh with the pinions 36' secured to the cross shafts 37 and which shaft is driven from the cross shaft 27 through the medium of a sprocket chain 38, working over the sprocket wheels 38' on the shaft 37 and trained over the sprocket wheels 38' and 39 secured respectively to the cross shafts 27 and shaft 39', Figs. 1, 2 and 3, the said sprocket chain 38 working over the idler sprocket wheel 40. The upper runs of the belts 32 which travel over the inclined upper surface of the top 2, work at the feed end of the machine over the pulley 41, mounted on cross shaft 42 which serves to support the belts to prevent the sagging thereof and to maintain the same in the proper line of travel, the direction of travel of the said belts being from the discharge toward the feed end of the machine, and in a direction the reverse of the line of travel of the upper run of the belts 6. The return runs of the said belts 32, work over and are supported by the inclined portions 3 of the table 2, working in guide-ways formed in the upper surface of the said sections 3, and being arranged parallel to the under run of the belts 6. In order to give a slight boost to the rotation of the cross shafts 26 and 42 there is arranged on each shaft a sprocket wheel 43 over which travels a sprocket chain 43', Figs. 1 and 2 of the drawings, the said sprocket wheel also running over the idler sprocket 44.

The parallel shafts 45 at the discharge end of the machine are connected at their inner ends to the first roller section of the rotary wall members 7 and to the outer end of each of said shafts is secured a pinion 46, which meshes with a companion pinion 47 secured to the cross shaft 39', which shaft at one end carries a sprocket wheel 39, which said sprocket wheel is driven by the sprocket chain not illustrated, which is driven from the sprocket gear 38' mounted on the power shaft 37, motion being thus transmitted to the shaft 39' for the driving of the rotary wall members of the fruit runways. However it will be understood, that any suitable form of drive mechanism may be employed for imparting rotation to the various shafts and pulleys for imparting motion of travel to the endless traveling belts.

To brackets 50 secured to and projecting from the supporting and guide walls 4, are secured the longitudinally disposed troughs 51, which serve as a cull trough and in said troughs work the endless traveling belts 52, termed in this art, cull-belts. The under runs of the cull-belts work over the upper surface of the downwardly inclined section 3 of the table 2 and lie parallel with the return run of the belts 32, Fig. 3 of the drawings.

To the apex of the table 2 and intermediate of the fruit runways B of the apparatus, a series of hinged vertically disposed deflector plates 55 are pivotally secured, Figs. 2 and 4 of the drawings, there being as many of said swinging deflector plates employed as there are discharge outlets for the sized fruit. The bottom edges of the said deflector plates are pivoted to brackets secured at intervals to the apex of the table 2 and from one end of each deflector plate or board extends a screw threaded stem 56, which projects through the slotted portion of a quadrant 57 and by means of a wing nut 58 working on the projecting portion of the screw threaded stem 56, the said swinging deflector plates may be secured in any desired position relative to the said quadrant. By means of said deflectors or gate pieces 55, the line of travel of the flow streams of the sized fruit may be varied so as to shunt certain of the sized fruit from one side of the machine to the other at will, thereby enabling the operator to distribute the flow of the sized fruit between the two sides of the apparatus and divide or proportion the flow streams of the sized fruit between the bins situated at each side of the machine, thereby enabling a certain number of the streams of sized fruit to go to the right-hand side of the machine and into the bins there situated to receive such sized fruit and the remaining sizes of the sized fruit to go to the fruit bins situated at the opposite side of the apparatus for the reception thereof. In other words, four sizes of sized fruit may be directed to one side of the apparatus and five sizes to the opposite side where nine sizes are provided for, and by such means, permitting each size of fruit to flow into bins having a capacity materially greater than the capacity of the bins employed where nine are situated at each side of the machine, or, as many bins on each side of the apparatus as there are sizes of fruit to be secured. If a deflector plate, board or partition piece is swung over its full distance from the center it will block out, so to speak, a discharged aperture of the fruit runway by forming an inclined surface over which the sized fruit passing therethrough will flow and be directed toward the opposite side of the machine to that which it otherwise would flow, with the result, that a size of fruit, which for instance would ordinarily discharge from the right hand side of the apparatus will be deflected to the left hand side. If the deflector board, plate or partition piece be swung so as to rest on the wall 29 on the left hand side of the apparatus, it will deflect the fruit which would ordinarily discharge at the left hand side of the apparatus to the right hand side thereof. If the deflector plates or partition pieces all stand in a vertical position or centrally of the apparatus, the fruit will flow to each side of the apparatus in a manner similar to that which it flows through an ordinary double sizer, but, where they are swung, as indicated, in dotted lines of Fig. 4 of the drawings, alternately to the right and left side, the flow streams of the sized fruit will be distributed between the right and left hand side of the apparatus, a certain proportion of the streams going to the bins situated at the right hand side of the apparatus and a certain portion flowing toward the bins situated at the left hand side of the apparatus, or in other words, the flow streams of the sized fruit will be substantially divided between the two sides of the apparatus and discharged into bins of much greater capacity than the bins employed with a double sizer.

The transverse dividing or partition walls 31ª of the fruit bins are made movable laterally so that by shifting the position of the partition pieces 31ª the area of the fruit bins may be increased or decreased at will, which is common practice in connection with fruit sizing devices.

The operation of the apparatus where employed as a single sizer is as follows:

The hinged fruit boards, partition pieces or barriers 55, are so positioned relative to the fruit runways as to properly proportion the flow streams of the sized fruit to the respective side of the apparatus and into the bins situated alongside thereof to receive the sized fruit, the arrangement being such preferably that four streams of the sized fruit flow to one side of the apparatus and five to the opposite side thereof. The fruit is fed into the apparatus at the feed end A, the smallest size of the fruit escaping through the outlets in the fruit runway nearest the feed end of the machine, and the next largest through the second discharge apertures and so on progresively throughout the length of the apparatus, the fruit being conveyed through the fruit runways B by means of the endless traveling conveyer belts 6. When the fruit reaches a discharge aperture 8 of the proper size, it moves beneath a reduced portion of the roller sections 9 of the rotary wall member 7 and escapes onto one of the endless traveling belts 32, depending upon the position of the deflector board plate or partition pieces 55. Inasmuch as these belts 32 travel in a reverse direction to the travel of the conveyer belts 6, the sized fruit is propelled by the said belts 32 against the longitudinally disposed wall 29 until it reaches one of the outlets 30, formed therein, through which it escapes and flows downwardly over the inclined surface of the extensions 3 of the table 2 and into the proper bin 31 situated for the reception thereof.

It frequently happens however, during the operation of a sizing apparatus that the fruit flowing into the bins tends to pile or pyramid at one end thereof and in order to maintain the even distribution of the fruit within the bins it is required that the position of discharge of the fruit into the bins be varied or shifted. For this purpose, the barrier boards 60 are employed, which boards are slidably fitted within the longitudinal grooves 61 formed in the upper surface of the downwardly inclined sides or extensions 3 of the table 2, so that when a barrier 60 is positioned in advance of either of the receiving bins, it will stand interposed between the under runs of the belts 6, and 32. When such boards are in position the direct downward flow of the sized fruit over the inclined surface of the extension 3 of the table 2 is arrested, the said boards or members 60 serving as a barrier wall along which the fruit will be propelled by the under run of the belt 6 until the end of the board barrier is reached, when the fruit will then flow downwardly over the under run of one of the belts 32, as the case may be directly into the bin designed for the reception of such size of fruit and the position of the discharge of the fruit relative to such bin varied. These barriers or retaining walls or boards are only positioned or brought into play when it is desired to change the discharge of the fruit relative to any given portion of the fruit receiving bins, which may be desired, where as stated the fruit tends to pyramid at one end of the receiving bin or compartment or where the area has been enlarged by shifting the position of the adjustable partition pieces 32ª, so as to produce a uniform distribution of the fruit throughout the bins. This feature of the barrier boards is fully set forth and described in United States Letters Patent No. 1,145,079 granted unto me under date of July 6, 1915, for improved sizer apparatus and need not be enlarged on herein.

Of course, it will be understod that a double set of barrier boards may be employed by placing one barrier board in the longitudinal grove 61, and another in the parallel groove 62, in which case, the fruit as it flows from within the sphere of the first barrier board 61 will travel over the surface of one of the belts 32 as the case may be and the flow of travel thereof be arrested by the barrier 62 and be brought backwardly by the reverse travel of the belt 32 on which it rests until the end of the barrier 62 is reached when it will escape from within the control of the barrier 62 and flow into its proper bin.

It will be noted that a fruit sizer is produced whereby materially increased bin capacity is obtained over the sizing apparatus at present in use, and one wherein the fruit runway is composed of two parallel members, one being a rotary wall member composed of a series of connected roller sections having reduced portions or each formed of two diameters and the opposing member being fixed or non-movable, to-wit, the supporting or guide wall 4, and that, at intervals throughout the length of said fixed or non-movable member of the fruit runway is provided adjustable means for varying the area of the discharge outlets for the sized fruit, which said adjustable members co-act with reduced portions of the roller sections of the rotary wall member to provide the requisite size of discharge outlets, the apparatus being capable of use either as a single or double sizer by reason of the controlling means which permits of the flow streams of the sized fruit being shunted from one side to the other of the apparatus at will and proportioned between the bins situated at the side of the apparatus. The apparatus as designed and constructed for operation fulfils all of the requirements necessary for an operative and efficient fruit sizer, forming, as it does, an apparatus of compact form for the work to be accomplished thereby, one wherein the arrangement of the working parts and the distribution of the receiving bins and the means for controlling the flow streams of the sized fruit and the distributing of the same between the said bins, provides for the employment of an apparatus of much less length than those at present utilized, and one wherein the fruit receiving bins are not required to be extended beyond the length of the sizer in order to obtain the desired increased bin capacity. The advantage of being able to adapt the apparatus for use as a double sizer or a single sizer at the will of the operator, will readily appeal to those conversant with the art and with the operation of fruit sizers. It will be understood that the cull belts are only employed for the removal of the undesirable oranges which are passed through the sizing outlets of the apparatus with the other fruit, the operators removing such fruit and placing the same by hand on cull belts which carries such fruit to a suitable place of deposit.

It will be understood that various changes may be made in the form and construction of the working parts of the apparatus without departing from the spirit and scope of the invention, and I therefore do not wish to be understood as confining or limiting the invention to the detailed arrangement of the working parts herein shown and described, but on the contrary wish to be understood as claiming the same as broadly as the state of the art will warrant.

While in the present instance there has been illustrated and described a fruit sizer having a plurality of fruit runways, it is obvious that only one fruit runway need be provided in a manner similar to the ordinary single sizer or what is commonly termed a "half sizer" now on the market, the fruit bins being situated at each side of the apparatus in such case, as in the case of the double sizer, there being a deflecting plate associated with each of the controlled sizing outlets through which discharges the sized fruit, so that the flow direction of the escaping sized fruit may be varied to either side of the machine, at the will of the operator and the flow of streams so controlled by the said deflector means as to permit or allow for a given number of streams flowing to one side of the apparatus and a given number to the opposite side, and in this manner the sized fruit be distributed between bins situated at each side of the machine, each being of materially greater capacity than the bins at present employed with a single or "half sizer," or if so directed, the deflecting means may be so positioned as to cause all of the sized fruit to flow to bins situated at one side of the apparatus.

Having thus described my invention what is claimed as new and desired to be protected and claimed by Letters Patent of the United States is:—

1. The combination with a fruit sizer having a longitudinally disposed fruit runway provided with a series of discharge outlets for the fruit to be sized, of deflectable means associated with each discharge outlet for varying the flow direction of the sized fruit with respect to the sides of the apparatus.

2. The combination with a fruit sizer provided with a plurality of discharge outlets for the fruit to be sized, and laterally movable means associated with said outlets for varying the flow direction of the sized fruit with respect to the sides of the apparatus.

3. The combination with a fruit sizer provided with a plurality of discharge outlets for the fruit to be sized, of swinging deflecting means associated with each of said discharge outlets for varying the flow direction of the escaping sized fruit with respect to the sides of the apparatus.

4. The combination with a fruit sizer provided with a series of discharge outlets for the fruit to be sized, and means associated with said discharge outlets for varying the flow direction of the escaping sized fruit with respect to the sides of the apparatus.

5. A sizing apparatus for fruit, the same comprising a fruit runway provided with a series of graduated discharge outlets for the sized fruit, and deflectable means associated with said outlets for varying the lateral flow of the discharging sized fruit with respect to the sides of the apparatus.

6. A fruit sizing apparatus having a fruit runway composed of two parallel spaced members and provided at intervals throughout the length thereof with a series of discharge outlets of progressively different areas, a series of fruit receiving bins situated at each side of the apparatus and deflecting means associated with each of the discharge outlets for varying the flow direction of the escaping sized fruit with respect to the bins situated at the sides of the apparatus.

7. A fruit sizing apparatus comprising a plurality of fruit runways each provided with a series of discharge outlets for the fruit to be sized, and deflecting means associated with said discharge outlets for varying the flow direction of the escaping sized fruit with respect to the sides of the apparatus.

8. The combination with a fruit sizer of the roller and belt type having a runway provided with a series of laterally disposed discharge outlets, and means associated with the runway and disposed adjacent each discharge outlet for controlling the lateral flow direction of the sized fruit with respect to the sides of the apparatus.

9. A fruit sizer having a fruit runway provided with a series of graduated discharge outlets arranged at intervals throughout the length thereof, and swinging deflectable means associated with each of said discharge outlets for varying the lateral flow directions of the discharging sized fruit with respect to bins situated at each side of the apparatus.

10. A fruit sizer composed of two fruit runways, each provided with a series of controllable discharge outlets arranged at intervals throughout the length thereof, and deflecting means associated with each of said discharge outlets for varying the flow direction of the streams of discharging sized fruit with respect to the fruit receiving bins situated at the side of the apparatus.

11. A fruit sizer having a plurality of associated parallel fruit runways each provided with a series of graduated discharge outlets for the escape of sized fruit therethrough, and means co-acting with each discharge outlet for controlling the flow direction of the sized fruit with respect to the sides of the apparatus.

12. The combination with a fruit sizer having a fruit runway composed of a movable and nonmovable parallel wall member and being provided with a series of graduated discharge outlets for the sized fruit, of deflecting means situated adjacent each discharge outlet for controlling the flow direction of the sized fruit escaping therethrough relative to the sides of the apparatus.

13. The combination with a fruit sizer composed of two parallel members forming a fruit runway provided with a series of graduated fruit discharge outlets throughout the length of the runway, and movable means associated with each discharge outlet of the fruit runway for varying the flow direction of the escaping sized fruit with respect to the sides of the apparatus.

14. A fruit sizing apparatus having a fruit runway composed of two parallel members, one of said members comprising a rotary wall formed of a series of united roller sections connected for rotation in unison, a series of discharge outlets disposed at intervals throughout the length of the runway for the escape of the sized fruit, a plurality of fruit directing means associated with said discharge outlets for varying the flow direction of the streams of discharging sized fruit with respect to the sides of the apparatus.

15. A fruit sizing apparatus having a fruit runway composed of rotating and non-rotating parallel members, a series of discharge outlets for the sized fruit disposed at intervals throughout the length of the runway, and a plurality of fruit directing means associated with said discharge outlets for varying the flow direction of the escaping sized fruit with respect to the sides of the apparatus.

16. A fruit sizer having fruit runways each composed of two parallel members provided at intervals throughout the length thereof with graduated discharge outlets, and means associated with each discharge outlet for varying the flow direction of the escaping sized fruit with respect to the fruit receiving bins situated at each side of the apparatus.

17. A fruit sizing apparatus having a fruit runway composed of two parallel spaced members, provided at intervals throughout the length thereof with outlets for the discharge of sized fruit, and laterally swinging deflecting means associated with each discharge outlet for varying the lateral flow direction of the fruit escaping therefrom.

18. A fruit sizer having a runway composed of two longitudinally disposed parallel members, one of said members consisting of a series of end to end roller sections connected one to the other so as to revolve in unison, said runway being provided at intervals throughout the length thereof with discharge outlets, a longitudinally movable fruit carrier for propelling fruit through the said runway, means for raising and lowering the said carrier adjacent each of the fruit discharge outlets for varying the outlet area thereof and means for controlling the lateral flow of the sized fruit passing through said outlets with respect to the sides of the apparatus.

19. The combination with a fruit sizer having a longitudinally disposed fruit runway provided with a series of graduated outlets for the discharge of sized fruit, of adjustable means situated adjacent each discharge outlet for varying at will the lateral flow direction of the sized fruit escaping from the fruit runway through the discharge outlets thereof with respect to the sides of the apparatus.

In testimony whereof I have signed my name to this specification in the presence of two subscribing witnesses.

GEORGE D. PARKER.

Witnesses:
S. A. MARKS,
CHARLES F. BROOKHART.